United States Patent [19]

McCauley et al.

[11] Patent Number: 4,480,513
[45] Date of Patent: Nov. 6, 1984

[54] BOLT-LOCK STRUCTURE

[75] Inventors: Lewis D. McCauley, Eggertsville; John H. Taylor, Orchard Park, both of N.Y.

[73] Assignee: McGard, Inc., Buffalo, N.Y.

[21] Appl. No.: 321,186

[22] Filed: Nov. 16, 1981

[51] Int. Cl.³ .............................................. B25B 13/48
[52] U.S. Cl. ........................................ 81/436; 81/461; 411/389; 411/403; 411/429
[58] Field of Search ............................ 81/436, 461, 460; 411/389, 429, 403, 910, 301, 903; 279/8; 70/175, 403

[56] References Cited

U.S. PATENT DOCUMENTS

| | | | |
|---|---|---|---|
| 1,457,994 | 6/1923 | Nedland | 279/8 |
| 2,133,146 | 10/1938 | Larrecq | 411/389 |
| 3,554,258 | 1/1971 | Duffy | 411/301 |
| 3,874,258 | 4/1975 | Semola et al. | 81/460 |
| 4,191,677 | 3/1980 | Strand | 411/903 |
| 4,253,509 | 3/1981 | Collet | 411/910 |
| 4,373,309 | 2/1983 | Lutz | 411/389 |

Primary Examiner—James L. Jones, Jr.
Attorney, Agent, or Firm—Joseph P. Gastel

[57] ABSTRACT

A bolt type of lock structure including an elongated bolt member, first and second externally threaded ends on the bolt member, first and second nuts of frustoconical configuration threadably mounted on the first and second threaded ends, first and second faces on the nuts for receiving key members for tightening and loosening the nuts, an anaerobic thread locking compound on the threads, the bolt member being relatively soft throughout to withstand impact and having a hardened zone in a central area wherein it is exposed to chiseling or sawing. A nut of the type described above including a threaded bore in the face which receives a screw for securing the key member thereto. A stud having oppositely threaded ends and an irregular axial bore in one end for receiving a wrench and a hardened surface portion between the threaded ends.

16 Claims, 9 Drawing Figures

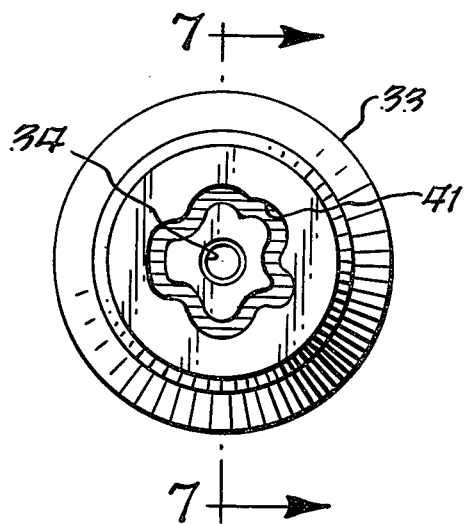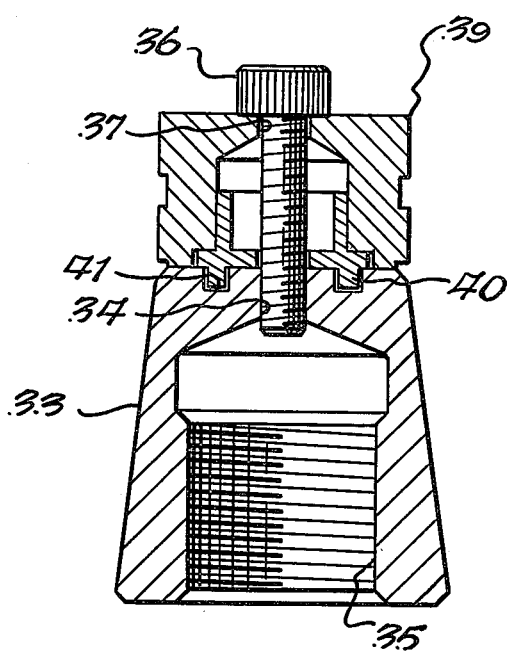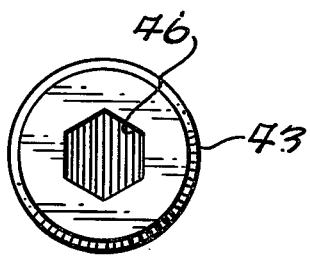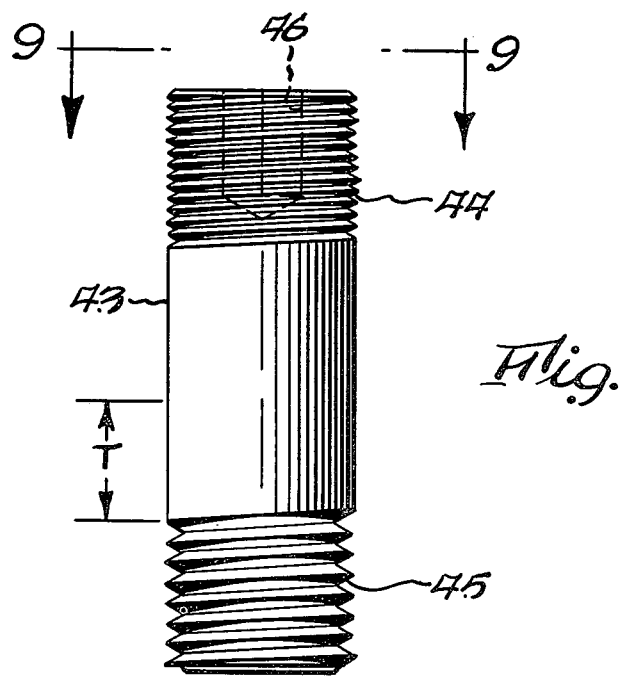

BOLT-LOCK STRUCTURE

BACKGROUND OF THE INVENTION

The present invention relates to an improved bolt-lock device for locking two flanges or the like together against unauthorized separation.

By way of background, theft of expensive and/or irreplaceable valves from oil wells or pipelines is achieved by unscrewing the nuts and bolts which hold flanges associated with the pipes together and removing the valves from the pipeline. In the past various types of locking devices were used to lock the flanges together. However, these devices were not foolproof in that they could be cut, sawed, shattered or disassembled so as to permit separation of the flanges. It is with overcoming the foregoing deficiencies of prior types of flange locking devices that the present invention is concerned.

SUMMARY OF THE INVENTION

It is accordingly one object of the present invention to provide an improved bolt type of lock structure which can be removed only by the use of specialized key-type of wrenches to which extremely high torques are applied.

Another object of the present invention is to provide an improved bolt-type of lock structure which is sufficiently soft in its unexposed parts so as to be incapable of being shattered by impact but which is sufficiently hardened in its exposed parts so that it is virtually chisel-proof and saw-proof.

Another object of the present invention is to provide an improved bolt type of lock structure which can be locked into position or unlocked from either end.

Yet another object of the present invention is to provide an improved bolt type of lock structure which mounts nuts which cannot be gripped by ordinary tools and which cannot in any way be defaced or marred so as to accept any conventional tools.

A still further object of the present invention is to provide an improved bolt type lock structure which in addition to having the foregoing features utilizes an anaerobic thread locking compound in conjunction with the threaded portions thereof for the purpose of requiring the disassembly torque to be much greater than that required for assembling the parts. Other objects and attendant advantages of the present invention will readily be perceived hereafter.

The present invention relates to a lock structure comprising an elongated bolt member, first and second externally threaded ends on said bolt member, first and second nuts of solid of revolution configuration, first and second internally threaded bores on said first and second nuts, respectively, for mating engagement with said first and second externally threaded ends, respectively, first and second outer faces on said first and second nuts, respectively, and first and second grooves of curved configuration in said first and second faces, respectively, for receiving key members for selectively tightening and loosening said nuts.

The present invention also relates to a stud for mounting in a tapped opening comprising an elongated member, first and second externally threaded ends on said elongated member, and a wrench-receiving bore extending axially of said elongated member in at least said first end of said elongated member.

The present invention also relates to a nut for mounting on a bolt comprising a body portion of solid of revolution configuration having first and second opposite faces, a first axially extending internally threaded bore of a first diameter extending inwardly from said first face, a groove in said second face for receiving a key, and a second axially extending internally threaded bore extending inwardly from said second face and being of a smaller diameter than said first bore.

The various aspects of the present invention will be more fully understood when the following portion of the specification are read in conjunction with the accompanying drawings wherein:

BRIEF DESCRIPTION OF THE DRAWINGS

FIG. 6 is a view similar to FIG. 3 and showing a modified form of nut having a tapped bore therein for receiving a screw associated with a key;

FIG. 7 is a cross sectional view taken substantially along line 7—7 of FIG. 6 and showing the nut of FIG. 6 in cross section with a key secured thereto by means of a screw;

FIG. 8 is a side elevational view of an improved stud of the present invention; and FIG. 9 is a view of the stud taken substantially in the direction of arrows 9—9 of FIG. 8.

DESCRIPTION OF THE PREFERRED EMBODIMENTS

Figure 1:
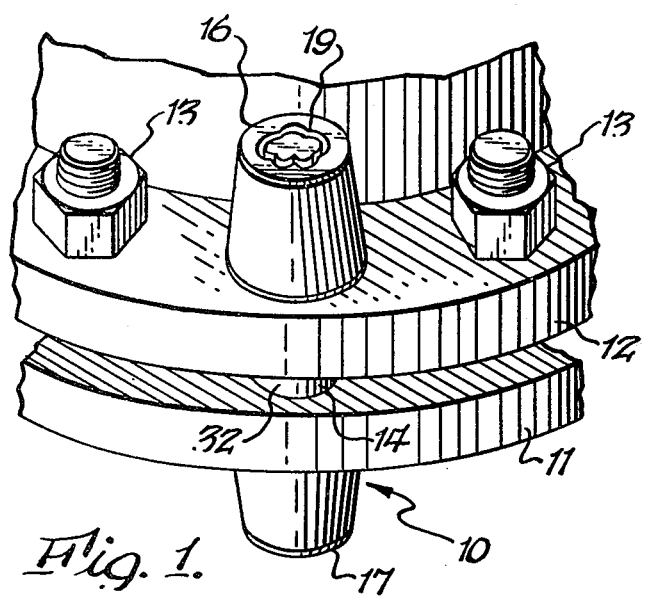
FIG. 1 is a fragmentary perspective view of the improved bolt-lock of the present invention mounted on adjacent flanges to prevent unauthorized separation thereof.
Figure 5:
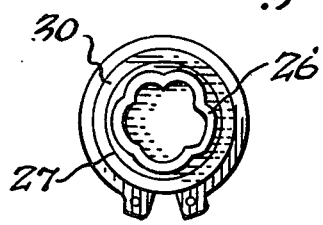
FIG. 5 is a view of the face of the key for turning the nut taken substantially in the direction of arrows 5—5 of FIG. 2.
Figure 3:
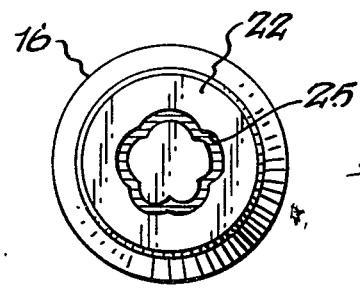
FIG. 3 is a view of one of the faces of the bolt-lock nuts taken substantially in the direction of arrows 3—3 of FIG. 2.
Figure 4:
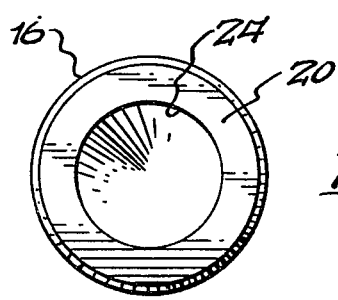
FIG. 4 is a view of the tapped end of the nut taken substantially in the direction of arrows 4—4 of FIG. 2.

Summarizing briefly in advance, the improved bolt-lock nut 10 is for the purpose of preventing separation of flanges 11 and 12 associated with pipes such as used in conjunction with oil wells, pipe lines or any other application wherein theft can occur by separating the flanges by removing the conventional nut and bolt assemblies 13 which are used to hold them in joined relationship.

The improved bolt-lock includes an elongated bolt or cylindrical elongated member 14 which is threaded at its opposite ends 15. Bolt member 14 fits through aligned holes (not shown) in flanges 11 and 12. Nuts 16 and 17, which may be identical except for the configuration of the grooves such as 19 therein, are threaded onto threaded ends 15. Nuts 16 and 17 are of frustoconical configuration and include large bases 20 and 21, respectively, and small bases 22 and 23, respectively. Nuts 16 and 17 are both tapped as at 24 to receive the threaded ends 15.

Each nut 16 and 17 has a curvilinear groove 25 and 28, respectively, in its smaller base for receiving a ridge or flange 26 of a key member 27 which has a body portion in the shape of hexagonal nut 29. The configuration of the groove and flange may be of the type disclosed in U.S. Pat. No. 3,241,408 which is incorporated herein by reference. When flange 26 is fitted into groove 25, face 30 of key 27 will abut face 22 of nut 16. By applying a wrench to hexagonal body 29 of key 27, nuts 16 and 17 can be tightened into engagement with flanges 12 and 11, respectively. The tightening is effected to a value of between 250 to 300 foot pounds, depending on the diameter of bolt 14.

An anaerobic coating 30 is applied to threads 15 or to threads 24. This coating can be placed on the bolts and/or nuts at the time of manufacture and it has a shelf life of approximately four years. However, when the nuts and bolt are assembled, the anaerobic coating will provide a thread-locking engagement between threads 15 and 24 so that removal of nuts 16 and 17 requires a much greater torque than that required to install them.

Figure 2:
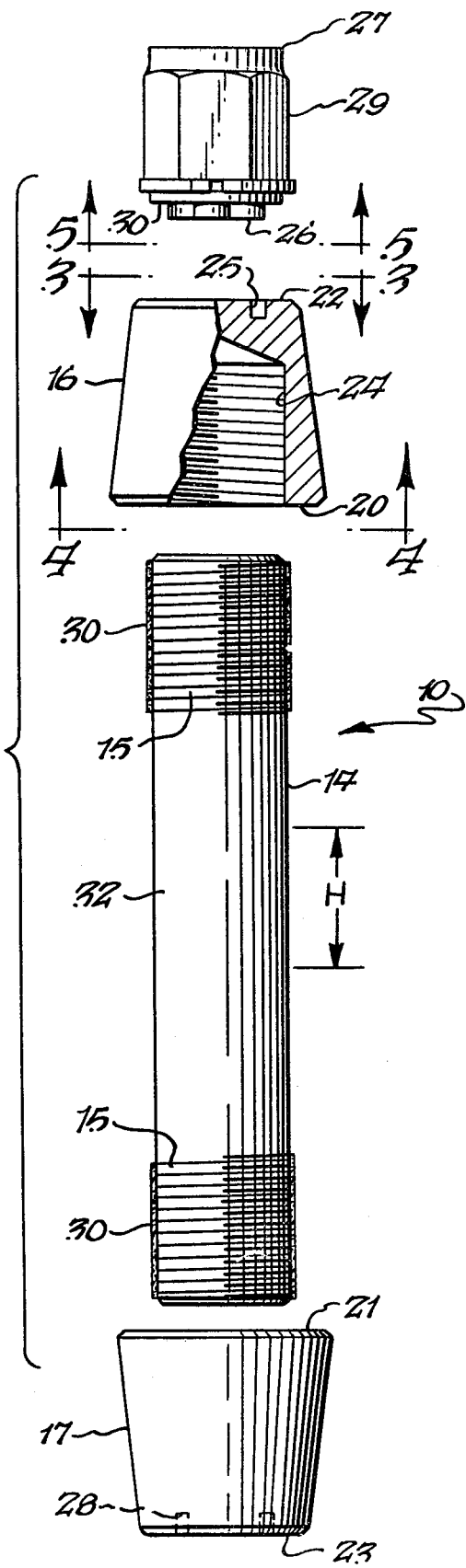
FIG. 2 is an exploded side elevational view, partially in cross section, of the improved bolt-lock of the present invention and showing a key for use therewith.

As can be seen from FIG. 1, usually the central portion 32 of bolt 14 is exposed so that access may be had thereto by means of a saw or chisel. Accordingly, the portion H (FIG. 2) of bolt 14, which is of greater axial length than the exposed portion 32, is hardened to make it saw-proof and chisel-proof. In this respect, the steel which is used for the bolt is 41L40. The bolt is carburized at 1600° F., and is then brought down to 1500° F. and quenched in oil. It is then passed through a draw in a vacuum furnace at 1100° F. for one hour. Thereafter, the bolt is placed into an induction hardening machine wherein a coil, approximately 1 inch long, is placed around bolt 14 in the area H and this portion is treated to a red hot condition and the bolt is thereafter quenched in water. Because of the high carbon content of the bolt, an extremely hard skin 0.040 to 0.060 inches thick is produced in the area H, but the core of area H and the ends of bolt 14 beyond area H remain sufficiently soft so that they are not brittle and thus cannot be fractured by pounding with a sledge hammer or the like.

Nuts 16 and 17 are fabricated from a triple nickel chrome plated 61L50 steel alloy and have a hardness of 58-59 on a Rockwell C scale. Nuts 16 and 17 are virtually chisel-proof and cannot be marred by any tools. Furthermore, the outer surfaces of nuts 16 and 17, being frustoconical, cannot be gripped by wrenches or any other tools to remove them from bolt 14, especially considering that they have been mounted on bolt 14 with a very high torque, and further, the removal torque is much greater because of the action of the anaerobic coating.

The grooves 25 and 28 in nuts 16 and 17, respectively, may be of the same curvilinear configuration or of different configuration. However, because such grooves exist, keys, such as 27, may be inserted into the grooves during the process of installing the bolt 10 or removing it to prevent undesired turning of bolt-lock 10 during the process of installation or removal. In addition, since threads 15 at the ends of bolt 14 extend for a substantial distance inwardly from its ends, the bolt-lock 10 inherently possesses an adjustability feature which permits the same bolt and nut to be used to connect flanges which are slightly different distances apart.

In FIGS. 6 and 7 a modified nut and key arrangement is shown. Nut 33 may be identical in all respects to nuts 16 and 17 except that it has a tapped bore 34 in line with tapped bore 35 to receive a screw 36 which passes through bore 37 of key 39 to hold flange 40 in locked engagement with groove 41. Key 39 has a hexagonal outer configuration just like key 27. The locking of key 39 to nut 33 is necessary to maintain flange 40 and groove 41 in engagement during the installation and removal of the nut 33 from the end of the bolt because of the fact that the high torques which are exerted on key 39 may cause the key to slip from locking engagement with the nut in the absence of a holding member, such as screw 36. It is to be noted that the threads 35 and 34 are of the same hand so that a screw, such as 36, cannot be used to turn nut 33 off of its associated bolt. Furthermore, the diameter of tapped bore 34 is so small relative to the diameter of tapped bore 35 that any attempt to turn nut 33 by means of a screw or the like adhesively secured within tapped bore 34 or otherwise jammed into tapped bore 34 will merely result in the breaking of the member so inserted because it will have a shear strength which is less than the amount of torque required to loosen nut 33.

In FIGS. 8 and 9 a modified form of bolt 43 is shown. Bolt 43 is in the nature of a cylindrical stud having oppositely threaded ends 44 and 45. Threaded end 45 is adapted to be inserted into any tapped bore, such as a receptacle embedded in concrete, or a blind bore in another member. Threaded end 44 includes a hexagonal bore 46 therein which is coaxial with bolt 43. An Allen wrench of suitable size is used for screwing threads 45 into an external member. An anaerobic coating is preferably applied to threads 45 and to threads 44. In use, after threads 45 have been installed in a tapped bore in a member, a nut, such as 16 or 33, may be mounted on threaded end 44 to bear against another member. The area T, which is exposed between the two members in the same manner as area H of bolt 14, is hardened in the same manner as described above relative to area H of bolt 14.

It is to be noted that nuts 16, 17 and 33 may be used on all of the bolts discussed above.

While preferred embodiments of the present invention have been disclosed, it will be appreciated that the present invention is not limited thereto but may be otherwise embodied within the scope of the following claims.

What is claimed is:

1. In a structure having a pair of flanges with a space therebetween with aligned holes in said flanges, a locking bolt structure extending through said aligned holes comprising an elongated bolt member, first and second externally threaded ends on said elongated bolt member, first and second nuts of solid of revolution configuration, first and second internally threaded bores on said first and second nuts, respectively, for mating engagement with said first and second externally threaded ends, respectively, first and second outer faces on said first and second nuts, respectively, first and second key-receiving depressions of curved endless configuration in said first and second faces, respectively, for receiving mating key members for selectively tightening and loosening said nuts, a hardened central portion on said elongated bolt member intermediate said first and second externally threaded ends, said hardened central portion being located in said space between said flanges, relatively ductile ends on said bolt member outwardly of said central portion, and a relatively ductile core within said hardened central portion.

2. A lock structure as set forth in claim 1 including a thread-locking compound between said external and internal threads.

3. A lock structure as set forth in claim 2 wherein said thread-locking compound is an anaerobic coating.

4. A lock structure as set forth in claim 1 wherein said nuts are frustoconical with larger and smaller bases, and wherein said first and second tapped bores are in said larger bases, and wherein said smaller bases comprises said faces.

5. A lock structure comprising an elongated bolt member, first and second externally threaded ends on said bolt member, first and second nuts of solid of revolution configuration, first and second internally threaded bores on said first and second nuts, respectively, for mating engagement with said first and second externally threaded ends, respectively, first and second outer faces on said first and second nuts, respectively, first and second key-receiving depressions of endless curved configuration in said first and second faces, respectively, for receiving mating key members for selectively tightening and loosening said nuts, a tapped bore in at least one of said outer faces, a key member having a flange for mating engagement with one of said depressions, a bore extending through said key member, and a screw extending through said bore for reception in said tapped bore for locking said key member to said nut.

6. A lock structure as set forth in claim 5 including a second tapped bore in the other of said outer faces, a second key member having a flange for mating engagement with the other of said depressions, a second bore extending through said second key member, and a second screw extending through said second bore for reception in said second tapped bore for locking said second key member to said other of said outer faces.

7. A stud for mounting in a tapped opening comprising an elongated member, first and second externally threaded ends on said elongated member, a wrench-receiving bore extending axially of said elongated member in at least said first end of said elongated member, a surface hardened portion on said elongated member between said threaded ends and adjacent said second threaded end, a nut of solid of revolution configuration, a tapped bore in said nut for engagement with said first threaded end, an outer face on said nut, a key-receiving depression of endless curved configuration in said outer face, a second tapped bore in said outer face, said second tapped bore being of smaller size than said tapped bore, a key member having a flange for mating engagement with said key-receiving depression, a bore extending through said key member, and a screw extending through said bore for reception in said second tapped bore for locking said key member to said nut.

8. A stud as set forth in claim 7 wherein said portions of said elongated member other than said surface hardened portion are relatively ductile.

9. In a structure having a flange and member and a space between said flange and said member, with a bore in said flange and a tapped opening in said member in alignment with said bore comprising an elongated bolt member, first and second externally threaded ends on said elongated bolt member, a nut of solid of revolution configuration, an internally threaded bore on said nut for mating engagement with said first threaded end, said second threaded end being received in said tapped opening in said member, an outer face on said nut, a key-receiving depression of endless curved configuration in said outer face for receiving a mating key member for selectively tightening and loosening said nut to cause it to bear on said flange, a hardened central portion on said elongated bolt member intermediate said first and second externally threaded ends, said hardened central portion being located in said space between said flange and said member, relatively ductile ends on said bolt member outwardly of said central portion, and a relatively ductile core within said hardened central portion.

10. A stud as set forth in claim 9 including thread-locking compound between said nut and elongated member.

11. A stud as set forth in claim 9 wherein said solid of revolution configuration is frustoconical.

12. In a structure as set forth in claim 9 including a wrench-receiving bore extending axially of said elongated member at said first threaded end.

13. In a structure as set forth in claim 9 including thread locking compound between said nut and said first threaded end and between said member and said second threaded end.

14. A nut and key combination comprising: a nut comprising a first body portion of solid revolution configuration having first and second opposite faces, a first internally threaded bore extending axially inwardly from said first face, key-receiving depression means having a predetermined curved periphery extending inwardly from said second face, a second internally threaded bore extending axially inwardly from said second face; and a key having a second body portion, a flange on said second body portion for mating engagement with said predetermined curved periphery of said depression means, and a screw mounted on said second body portion for reception in said second internally threaded bore for locking said key to said nut.

15. A nut and key combination as set forth in claim 14 wherein said second internally threaded bore is located within said curved periphery and is smaller than said first internally threaded bore.

16. A nut and key combination as set forth in claim 15 wherein said first body portion is frustoconical.

* * * * *